(12) United States Patent
Han et al.

(10) Patent No.: US 11,589,207 B2
(45) Date of Patent: Feb. 21, 2023

(54) ELECTRONIC DEVICE FOR IDENTIFYING EXTERNAL ELECTRONIC DEVICE AND METHOD OF OPERATING SAME

(71) Applicant: Samsung Electronics Co., Ltd., Suwon-si (KR)

(72) Inventors: Seongwon Han, Suwon-si (KR); Woojin Park, Suwon-si (KR); Hosun Lee, Suwon-si (KR); Sangwon Gil, Suwon-si (KR); Donguk Kim, Suwon-si (KR); Choonghoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 17/033,414

(22) Filed: Sep. 25, 2020

(65) Prior Publication Data

US 2021/0099855 A1    Apr. 1, 2021

(30) Foreign Application Priority Data

Sep. 27, 2019    (KR) .................. 10-2019-0119471

(51) Int. Cl.
*H04W 8/00*    (2009.01)
*H04W 24/08*    (2009.01)
*H04L 43/0894*    (2022.01)

(52) U.S. Cl.
CPC ......... *H04W 8/005* (2013.01); *H04L 43/0894* (2013.01); *H04W 24/08* (2013.01)

(58) Field of Classification Search
None
See application file for complete search history.

(56) References Cited

U.S. PATENT DOCUMENTS

| 2010/0112954 A1 | 5/2010 | Son |
| 2018/0212989 A1 | 7/2018 | Mavani |

(Continued)

FOREIGN PATENT DOCUMENTS

| JP | 2008-021254 A | 1/2008 |
| JP | 2008-028931 A | 2/2008 |

(Continued)

OTHER PUBLICATIONS

K. Wu and B. Lagesse, "Do You See What I See? Detecting Hidden Streaming Cameras Through Similarity of Simultaneous Observation," 2019 IEEE International Conference on Pervasive Computing and Communications, Mar. 11-15, 2019, 10 pages (Year: 2019).*

(Continued)

*Primary Examiner* — Saad Khawar

(57) ABSTRACT

According to various embodiments, an electronic device includes a wireless communication module, and at least one processor, wherein the at least one processor is configured to: acquire data rate information of at least one external electronic device through the wireless communication module; identify a first external electronic device having a data rate pattern corresponding to a first condition among the at least one external electronic device based on the data rate information; identify channel state information (CSI) of a channel through which the first external electronic device performs communication, through the wireless communication module; identify whether the data rate pattern of the first external electronic device matches a CSI pattern of the channel; and identify whether a space where the electronic device is located is captured by the first external electronic device based on the identification result.

18 Claims, 15 Drawing Sheets

(56) References Cited

U.S. PATENT DOCUMENTS

2019/0026212 A1  1/2019  Verkasalo
2022/0005337 A1* 1/2022  Shin ........................ H04W 4/70

FOREIGN PATENT DOCUMENTS

JP    2008-301296 A    12/2008
KR   10-2008-0043211 A  5/2008

OTHER PUBLICATIONS

Y. Cheng, X. Ji, T. Lu and W. Xu, "On Detecting Hidden Wireless Cameras: A Traffic Pattern-based Approach," in IEEE Transactions on Mobile Computing, vol. 19, No. 4, pp. 907-921, originally published in print on Feb. 21, 2019 as per https://ieeexplore.ieee.org/document/8648293, 15 pages. (Year: 2019).*
International Search Report dated Jan. 7, 2021 in connection with International Patent Application No. PCT/KR2020/013156, 3 pages.
Written Opinion of the International Searching Authority dated Jan. 7, 2021 in connection with International Patent Application No. PCT/KR2020/013156, 4 pages.
Liu et al., "Detecting Wireless Spy Cameras via Stimulating and Probing", MobiSys, Jun. 10-15, 2018, 13 pages.
Supplementary European Search Report dated Jul. 19, 2022 in connection with European Patent Application No. 20 86 9119, 8 pages.

* cited by examiner

ELECTRONIC DEVICE FOR IDENTIFYING EXTERNAL ELECTRONIC DEVICE AND METHOD OF OPERATING SAME

CROSS-REFERENCE TO RELATED APPLICATION

This application is based on and claims priority under 35 U.S.C. § 119 to Korean Patent Application No. 10-2019-0119471, filed on Sep. 27, 2019, in the Korean Intellectual Property Office, the disclosure of which is herein incorporated by reference in its entirety.

BACKGROUND

1. Field

Various embodiments of the disclosure relate to an electronic device that identifies an external electronic device and a method for operating the same.

2. Description of Related Art

In recent years, devices (for example, cameras) capable of capturing videos have been miniaturized. The videos captured by cameras may be illegally leaked to the outside in real time through wireless communication. The miniaturization and high-performance of cameras have been exploited, such that social problems due to hidden cameras have been raised. However, there is a problem in that it is difficult to detect a hidden camera due to small size and high performance of the hidden camera.

Accordingly, there is a growing interest in devices and applications that detect hidden cameras.

SUMMARY

A user has to purchase a device for detecting a hidden camera to find a hidden camera. However, there is an inconvenience in that the user must have such a device and must carry the device in order to detect a hidden camera.

Meanwhile, a technology is being developed that can determine whether streaming is performed in real time by checking wireless packets. However, since only whether real-time streaming is performed is determined, there is a problem in that it is impossible to check whether a space currently being captured is a space where the user is present.

Various embodiments can provide an electronic device and a method of operating the same, which can identify whether a camera is present, as well as whether a space captured by a camera is a space where a user is present.

According to various embodiments, an electronic device may include a wireless communication module (e.g., wireless communication interface); and at least one processor, wherein the at least one processor is configured to: acquire data rate information of at least one external electronic device through the wireless communication module; identify a first external electronic device having a data rate pattern corresponding to a first condition among the at least one external electronic device based on the data rate information; identify channel state information (CSI) of a channel through which the first external electronic device performs communication, through the wireless communication module; identify whether the data rate pattern of the first external electronic device matches a CSI pattern of the channel; and identify whether a space where the electronic device is located is captured by the first external electronic device based on identifying that the data rate pattern of the first external electronic device matches the CSI pattern of the channel.

According to various embodiments, a method of operating an electronic device may include: acquiring data rate information of at least one external electronic device; identifying a first external electronic device having a data rate pattern corresponding to a first condition among the at least one external electronic device based on the data rate information; identifying channel state information (CSI) of a channel through which the first external electronic device performs communication; identifying whether the data rate pattern of the first external electronic device matches a CSI pattern of the channel; and identifying whether a space where the electronic device is located is captured by the first external electronic device based on identifying that the data rate pattern of the first external electronic device matches the CSI pattern of the channel.

According to various embodiments, an electronic device may include: a camera, a wireless communication module (e.g., wireless communication interface); and at least one processor, wherein the at least one processor is configured to: acquire data rate information of at least one external electronic device through the wireless communication module; identify a first external electronic device having a data rate pattern corresponding to real-time streaming among the at least one external electronic device based on the data rate information; acquire video data by using the camera based on identifying the first external electronic device; identify whether a pattern of the video data matches the data rate pattern of the first external electronic device; and identify whether a space where the electronic device is located is captured by the first external electronic device based on identifying that the pattern of the video data matches the data rate pattern of the first external electronic device.

An electronic device and a method of operating the same according to various embodiments may identify whether a camera is present and whether a space captured by the camera is a space where a user is present.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
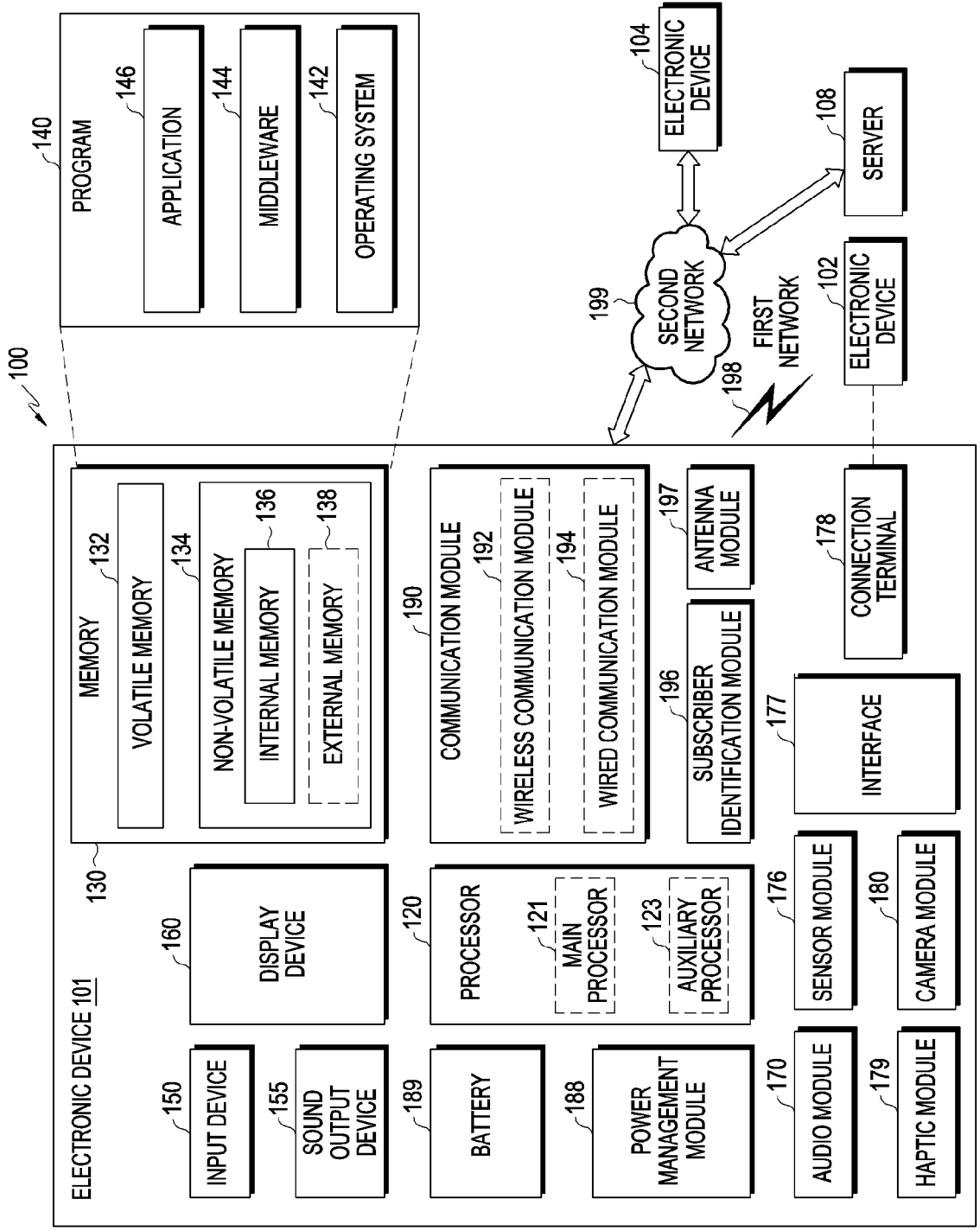
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
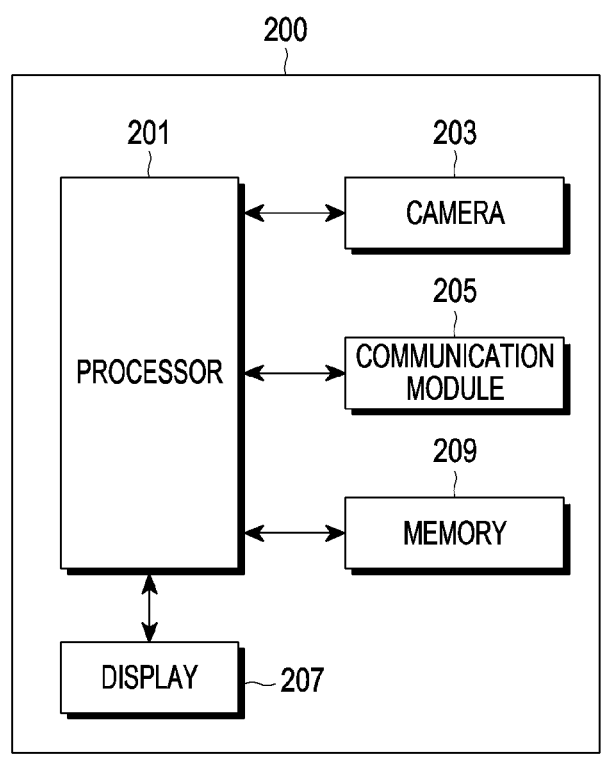
FIG. 2 illustrates a schematic block diagram of an electronic device according to various embodiments.

FIG. 2 illustrates a schematic block diagram of an electronic device according to various embodiments.

Referring to FIG. 2, an electronic device 200 may include a processor 201, a camera 203, a communication module 205, a display 207, and a memory 209. For example, the electronic device 200 may be implemented in the same manner as or similar manner to the electronic device 101 of FIG. 1.

According to various embodiments, the electronic device 200 may control the overall operation of the processor 201. The processor 201 may be electrically connected to the memory 209, and the memory 209 may store instructions that, when executed, cause the processor 201 to perform operations. For example, the processor 201 may be implemented in the same manner as or similar manner to the processor 120 of FIG. 1.

According to various embodiments, the processor 201 may acquire data rate information on at least one external electronic device through the communication module 205. The data rate information may refer to time-series information of the data rate for each of at least one external electronic device connected to an access point. For example, the data rate information may indicate a data rate of at least one external electronic device during an arbitrary time period. For example, the processor 201 may identify a header field of a communication signal transmitted from an external electronic device. The header field may include, for example, a source address and a destination address of a communication signal and a size of a packet to be transmitted. The processor 201 may identify the data rate based on the size of a packet corresponding to an arbitrary source address. Accordingly, the processor 201 may identify time-series information of the data rate by continuously identifying the header field of a plurality of communication signals transmitted by an arbitrary external electronic device.

According to various embodiments, the processor 201 may identify a first external electronic device having a data rate pattern corresponding to a first condition based on the data rate information. The data rate pattern may be time-series information of a data rate for one external electronic device among at least one external electronic device. For example, the processor 201 may identify whether there is a data rate pattern representing real-time streaming among data rate patterns of the at least one external electronic device. When the external electronic device captures a static space and uses a real-time streaming service, the size of data to be transmitted may be constant. Based on these characteristics, the processor 201 may identify, when the size of the data rate is constant, that this is a data rate pattern representing real-time streaming. Here, the fact that the size of the data rate is constant may include a case where the amount of change in the data rate is less than or equal to a threshold value.

According to various embodiments, the processor 201 may identify channel state information (CSI) of a channel through which the first external electronic device performs communication through the communication module 205. When it is identified that the first external electronic device uses a real-time streaming service, the processor 201 may identify a CSI pattern of the channel through which the first external electronic device performs communication in an arbitrary time interval, based on CSI on the channel through which the first external electronic device performs communication. The CSI pattern may refer to time-series information of the CSI on the first external electronic device.

According to various embodiments, the processor 201 may identify whether a data rate pattern of the first external electronic device matches the CSI pattern of the channel. For example, a time point at which the data rate of the first external electronic device changes corresponds to a time point at which the CSI of the channel changes, the processor 201 may determine that the data rate pattern of the first external electronic device matches the CSI pattern of the channel. Meanwhile, the fact that the time point at which the data rate of the first external electronic device changes corresponds to the time point at which the CSI of the channel changes may include a case in which the two time points coincide with each other or a case having an error corresponding to a processing time to transmit a video captured by the first external electronic device. When an object including a person moves within a specific space, CSI may change. In addition, when an object moves, the data size of a video capturing the movement of the object may also be changed by the movement of the object. Here, the data size of the captured video may be the size of data obtained by encoding the captured video. When a time point at which the CSI changes corresponds to a time point at which the data rate of a communication signal transmitting the captured video changes, it may mean that there is a camera that captures a space in which the electronic device 200 is located. Accordingly, the processor 201 may determine that there is a camera when the time point of the change in the CSI corresponds to the time point of the change in the data rate. According to various embodiments, the processor 201 may determine whether there is a camera capturing the space where the electronic device 200 is located, based on whether a time point of a change in various factors (e.g., received signal strength indicator (RSSI), reference signal received quality (RSSQ), etc.) capable of indicating a channel matches a time point of a change in the data rate, as well as whether the CSI matches the data rate.

According to various embodiments, the processor 201 may identify whether the space where the electronic device 200 is located is captured by the first external electronic device, based on whether the matching is performed. For example, the processor 201 may notify that the first external electronic device is present using the display 207.

Figure 3:
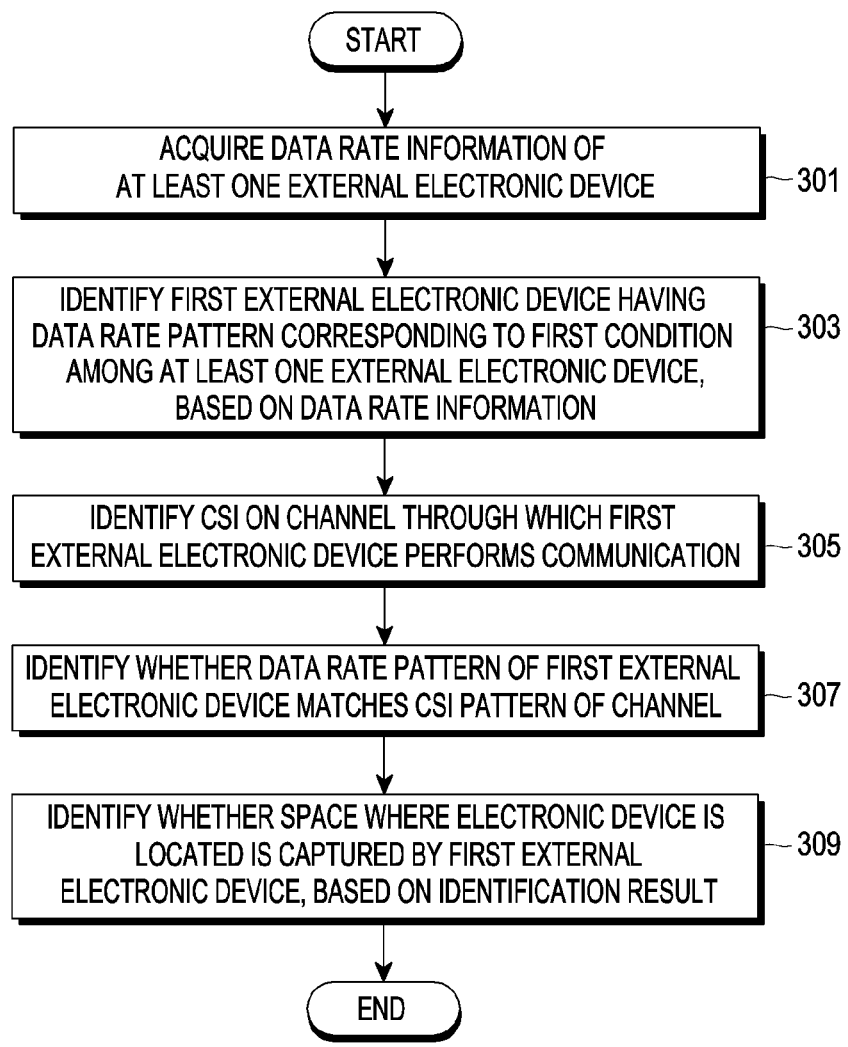
FIG. 3 illustrates a flowchart of a method for operating an electronic device according to various embodiments.
Figure 4A:
FIG. 4A illustrates a data rate pattern according to various embodiments.
Figure 4B:
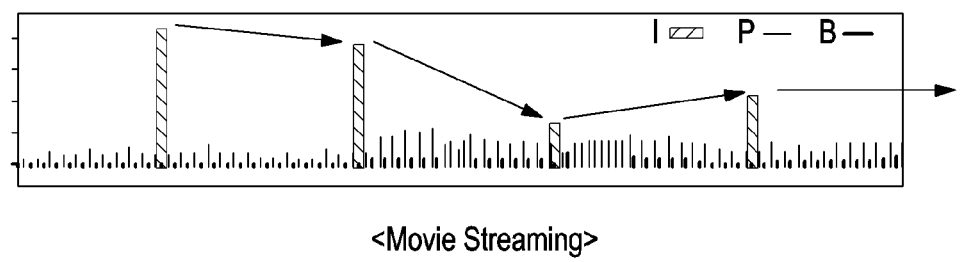
FIG. 4B illustrates a data rate pattern according to various embodiments.
Figure 5A:
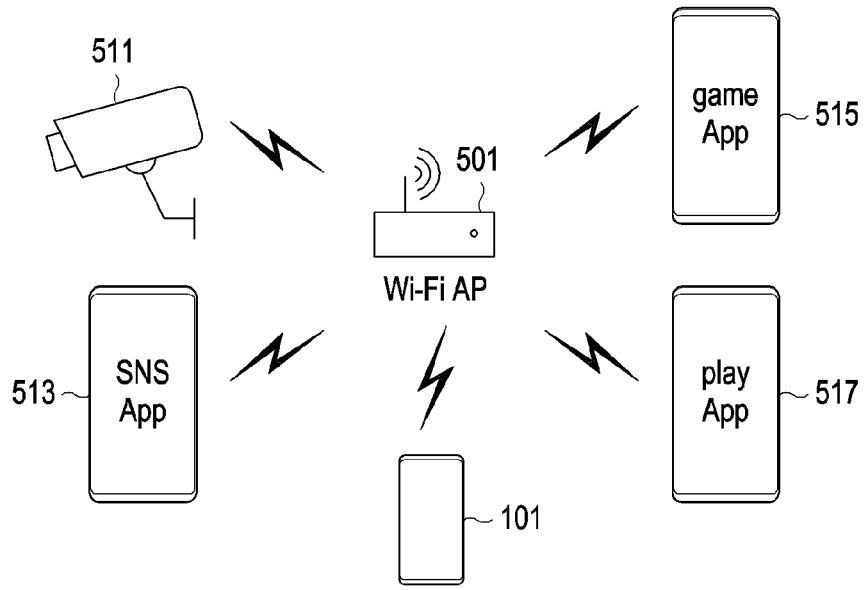
FIG. 5A illustrates a data rate pattern according to various embodiments.
Figure 5B:
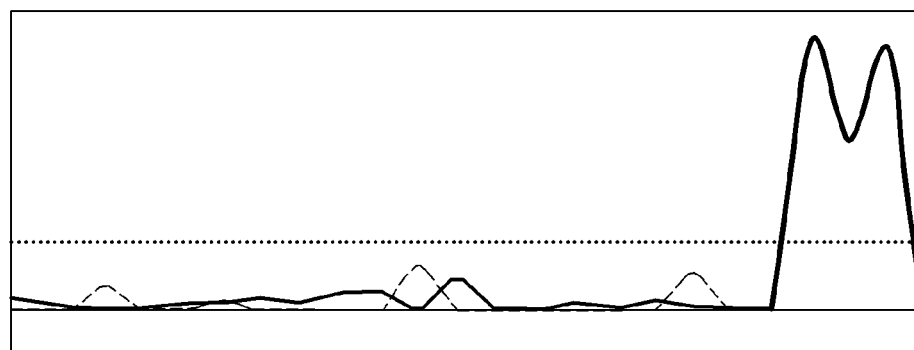
FIG. 5B illustrates a data rate pattern according to various embodiments.

FIG. 3 illustrates a flowchart of a method for operating an electronic device according to various embodiments. The embodiment of FIG. 3 will be described in more detail with reference to FIGS. 4A, 4B, 5A, and 5B. FIG. 4A illustrates a data rate pattern according to various embodiments. FIG. 4B illustrates a data rate pattern according to various embodiments. FIG. 5A illustrates a data rate pattern according to various embodiments. FIG. 5B illustrates a data rate pattern according to various embodiments.

Referring to FIG. 3, according to various embodiments, in operation 301, an electronic device 101 (e.g., the processor 120) may acquire data rate information of at least one external electronic device (e.g., the electronic device 104 of FIG. 1). The electronic device 101 may identify a packet transmitted by at least one external electronic device that performs communication with an access point (AP). The electronic device 101 may identify unencrypted information (e.g., a packet size, a transmission/reception address, a sequence number, a port number, etc.) among a plurality of pieces of information included in the packets. For example, the electronic device 101 may identify the packet to identify a data rate of a data stream transmitted by at least one external electronic device. The electronic device 101 may calculate a change in the data rate in real time.

According to various embodiments, in operation 303, the electronic device 101 may identify a first external electronic device having a data rate pattern corresponding to a first condition among the at least one external electronic device, based on data rate information.

Meanwhile, the electronic device 101 may preferentially determine whether there is an external electronic device for streaming a video among the at least one external electronic device. For example, when the data rate maintains a threshold value or more over a predetermined time interval, the electronic device 101 may determine that the external electronic device for streaming the video exists. When it is identified that the external electronic device for streaming the video exists, the electronic device 101 may determine whether an external electronic device for streaming a video in real time exists among the external electronic devices for streaming the video.

For example, FIG. 4A illustrates a data rate pattern for streaming a video obtained by capturing a static space in real time. When the static space is captured and transmitted, the size of the transmitted data may be constant. For example, as illustrated in FIG. 4B, when a video (e.g., a movie) is played, the size of data to be transmitted may be different for each frame, so that the data rate may not be constant. When the data rate is constant, the electronic device 101 may identify that the constant data rate corresponds to the first condition. Meanwhile, the fact that the data rate is constant may include a case in which the change in the data rate is less than or equal to a threshold value.

As illustrated in FIG. 5A, an access point (AP) 501 may be connected to the electronic device 101, a first external electronic device 511, a second external electronic device 513, a third external electronic device 515, and a fourth external electronic device 517. The number of external electronic devices connected to the AP 501 is irrelevant. For example, the first external electronic device 511 may be a camera capturing a video. For example, the second external electronic device 513 may be executing a social network service (SNS) application. For example, the third external electronic device 515 may be executing a game application. For example, the fourth external electronic device 517 may be executing a video reproduction application.

As illustrated in FIG. 5B, the electronic device 101 may acquire data rate information on a plurality of external electronic devices 511, 513, 515, and 517. A data rate pattern in which the first external electronic device 511 captures a specific space and streams the specific space in real time may be represented by reference numeral 521. A data rate pattern of the second external electronic device 513 executing the SNS application may be represented by reference numeral 523. A data rate pattern of the third external electronic device 515 executing the game application may be represented by reference numeral 525. A data rate pattern of the fourth external electronic device 517 executing the video reproduction application may be represented by reference numeral 527. The electronic device 101 may identify an external electronic device using a real-time streaming service among the identified multiple data rate patterns. For example, as illustrated in FIG. 4A, when a data rate pattern indicating a real-time streaming service is identified, the electronic device 101 may identify that there is the first external electronic device 511 using the real-time streaming service. For illustrative purposes, it is described that one external electronic device is executing one application, but one external electronic device can execute multiple applications, and the electronic device 101 can identify a data rate pattern for each application using a network.

According to various embodiments, in operation 305, the electronic device 101 may identify channel state information (CSI) on a channel through which the first external electronic device performs communication. When it is identified that the first external electronic device uses the real-time streaming service, the electronic device 101 may identify a CSI pattern of a channel through which the first external electronic device performs communication in an arbitrary time interval, based on the CSI on the channel through which the first external electronic device performs communication. The electronic device 101 may identify a change in the CSI pattern of the channel through which the first external electronic device performs communication.

According to various embodiments, in operation 307, the electronic device 101 may identify whether the data rate pattern of the first external electronic device matches a channel state information (CSI) pattern. For example, when a person's movement occurs in a space captured by the first external electronic device, a data rate may change because the size of data being streamed in real time increases. Also, when a person's movement occurs, the CSI of the channel through which the first external electronic device performs communication may change. The electronic device 101 may identify whether a time point at which the data rate of the first external electronic device changes corresponds to a time point at which the CSI of the channel changes. When a difference between the time point at which the data rate of the first external electronic device changes and the time point at which the CSI of the channel changes is less than or equal to a predetermined value, the electronic device 101 may identify that the time point at which the data rate changes and the time point at which the CSI of the channel changes correspond to each other. Accordingly, the electronic device 101 may identify that the data rate pattern and the CSI pattern match when the difference between the time point at which the data rate changes and the time point at which the CSI of the channel changes is less than or equal to the predetermined value. When a plurality of time points at which the CSI of the channel changes (e.g., 10 time points) is provided, the electronic device 101 may identify that the data rate pattern of the first external electronic device matches the CSI pattern of the channel only when the plurality of time points at which the data rate changes (equal to or greater than a threshold value {e.g., eight time points or more}) is provided.

According to various embodiments, in operation 309, the electronic device 101 may identify whether a space where the electronic device 101 is located is captured by the first external electronic device, based on the identification result. When it is identified that the data rate pattern of the first external electronic device matches the CSI pattern of the channel through which the first external electronic device performs communication, the electronic device 101 may identify that the space where the electronic device 101 is located is captured by the first external electronic device.

Figure 6:
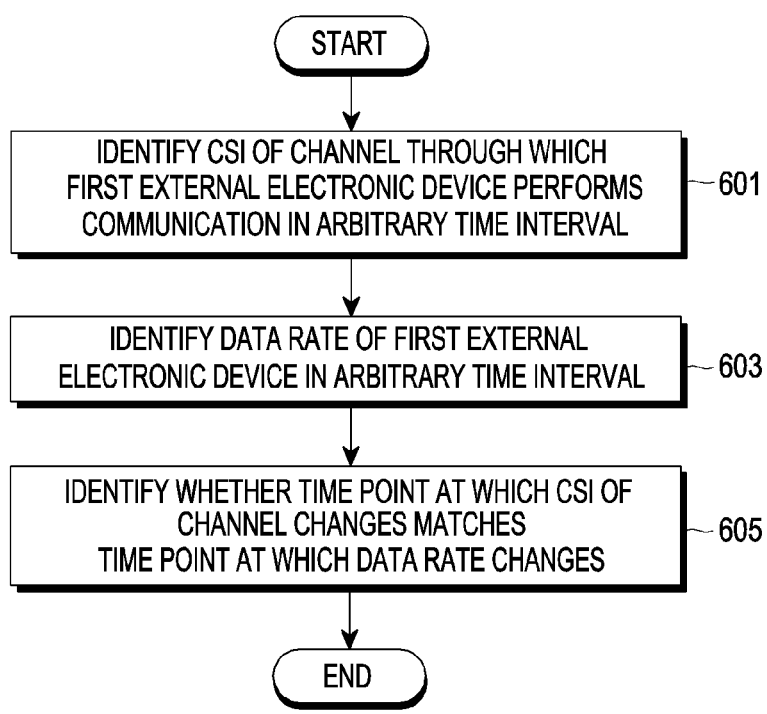
FIG. 6 illustrates a flowchart of a method for operating an electronic device according to various embodiments.
Figure 7A:
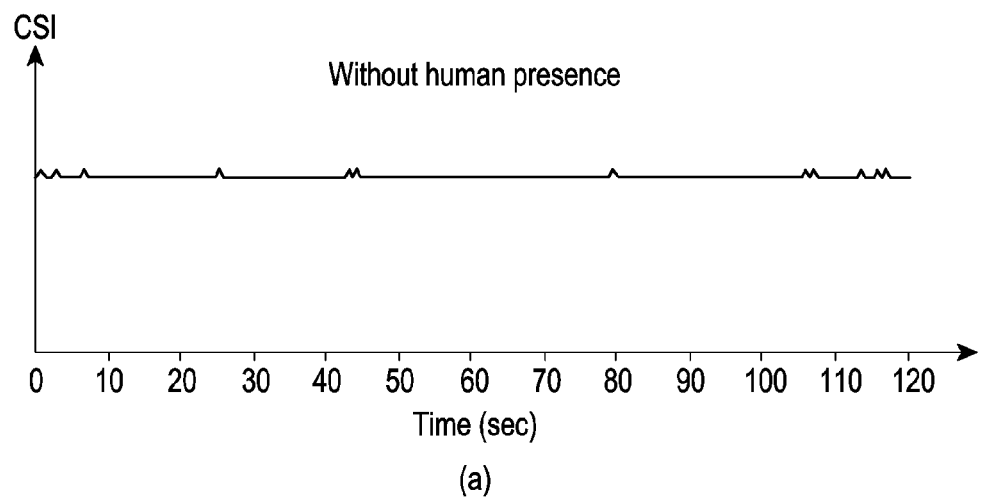
FIG. 7A illustrates channel state information (CSI) and a data rate pattern according to various embodiments.
Figure 7A:
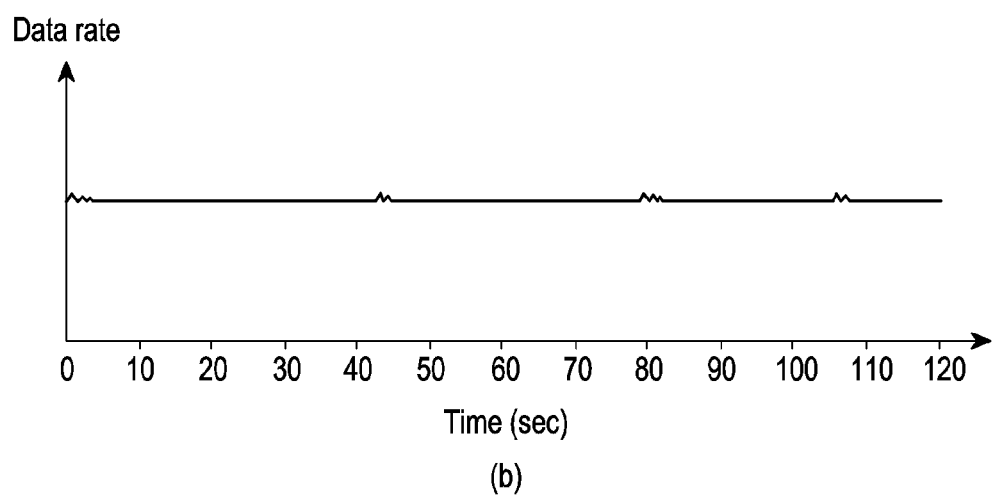
Figure 7B:
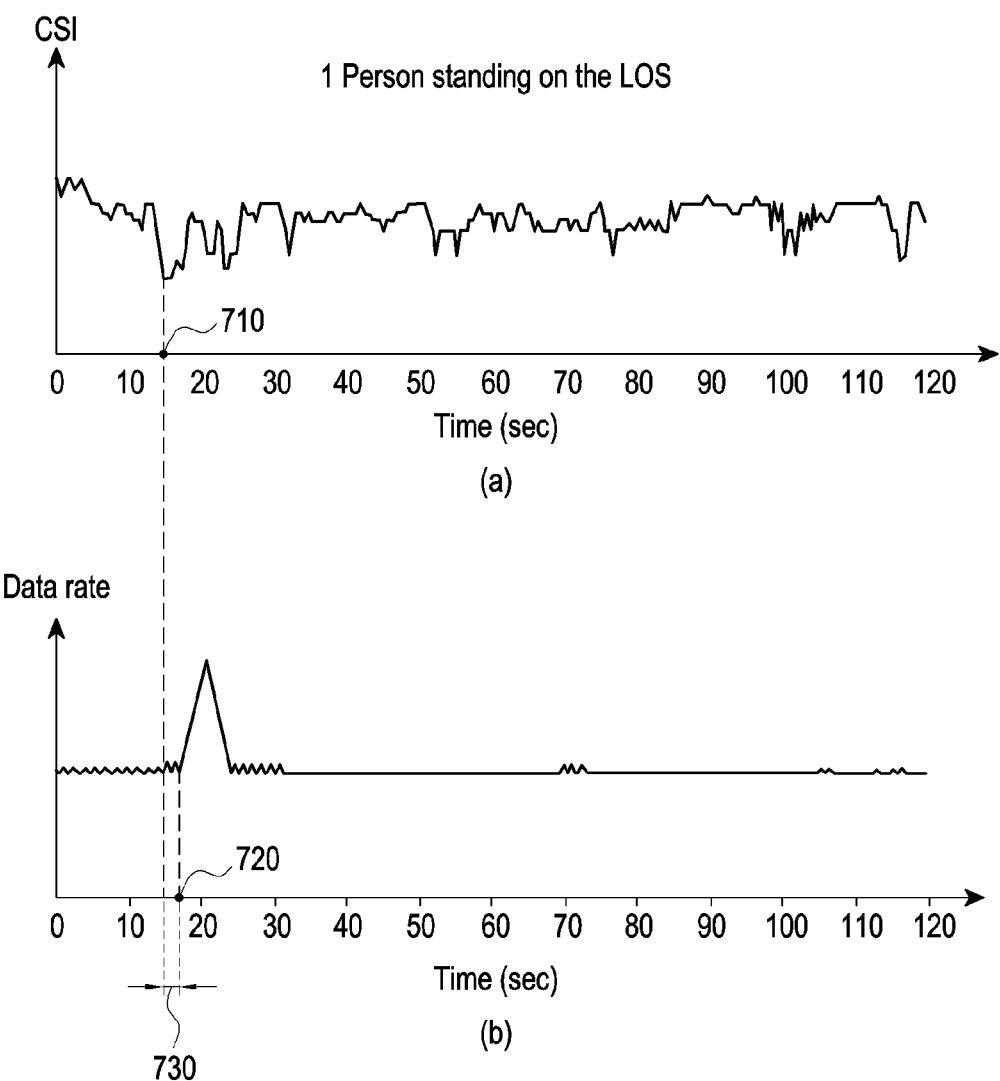
FIG. 7B illustrates CSI and a data rate pattern according to various embodiments.
Figure 7C:
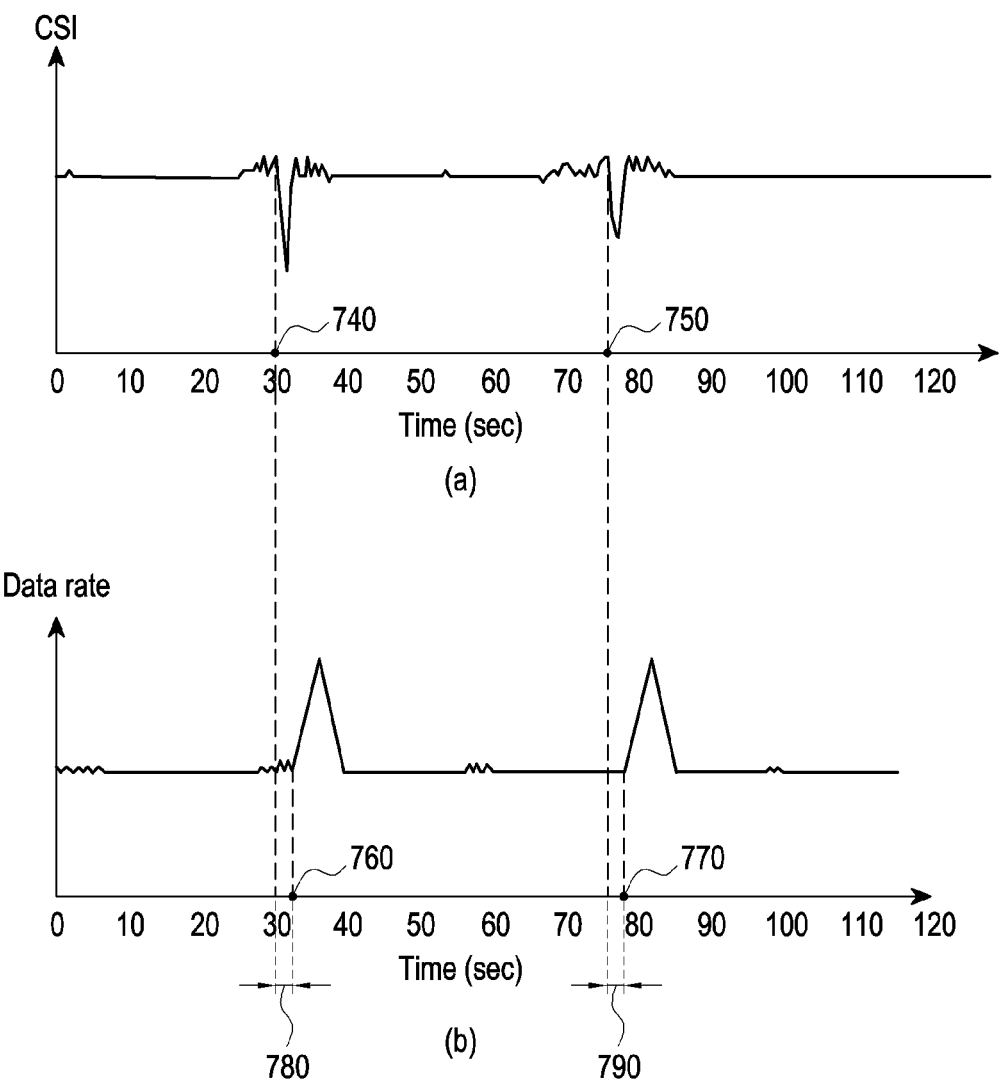
FIG. 7C illustrates CSI and a data rate pattern according to various embodiments.

FIG. 6 illustrates a flowchart of a method for operating the electronic device 101 according to various embodiments. The embodiment of FIG. 6 will be described in more detail with reference to FIGS. 7A, 7B, and 7C. FIG. 7A illustrates CSI and a data rate pattern according to various embodiments. FIG. 7B illustrates CSI and a data rate pattern according to various embodiments. FIG. 7C illustrates CSI and a data rate pattern according to various embodiments.

According to various embodiments, in operation 601, the electronic device 101 (e.g., the processor 120) may identify a CSI pattern of a channel through which the first external electronic device performs communication in an arbitrary time interval. The electronic device 101 may identify a signal emitted by the first external electronic device to identify the CSI pattern of the channel through which the first external electronic device performs communication.

According to various embodiments, in operation 603, the electronic device 101 may identify the data rate of the first external electronic device in the arbitrary time interval. The electronic device 101 may identify unencrypted information (e.g., a packet size, a transmission/reception address, a sequence number, a port number, etc.) among a plurality of pieces of information included in a packet transmitted by the first external electronic device. The electronic device 101 may identify the packet to store the data rate of a data stream transmitted by the first external electronic device in time series.

According to various embodiments, in operation 605, the electronic device 101 may identify whether a time point at which the CSI of the channel changes corresponds to a time point at which the data rate changes. The electronic device 101 may identify whether the data rate also changes when the CSI of the channel of the first external electronic device stored in time series changes. For example, when there is a person's movement in a space where the electronic device 101 is located, the data rate of the first external electronic device may increase, and the CSI of the channel may decrease. For example, when there is no movement in a space captured by the external electronic device, the same video may be captured, so that the data rate of the data stream transmitted by the first external electronic device may be constant. In addition, when there is no movement in the captured space, the CSI of the channel through which the first external electronic device performs communication may be constant because there is no change in an element blocking signals transmitted and received by the first external electronic device. Meanwhile, when a person's movement occurs in the space captured by the first external electronic device, the data rate of the data stream transmitted by the first external electronic device may increase because the data size of the captured video increases. In addition, since the signal transmitted and received between the AP and the first external electronic device is attenuated by a person existing in the same space as the first external electronic device, the CSI on the channel through which the first external electronic device performs communication may be reduced when a person's movement occurs in the space captured by the first external electronic device.

For example, FIGS. 7A, 7B, and 7C are described on the assumption that the first external electronic device captures a space in which the electronic device 101 is located. In addition, the fact that the CSI or data rate of the channel is constant may mean a case where the amount of change in the CSI of the channel or the amount of change in the data rate is less than or equal to a threshold value.

For example, as illustrated in (a) of FIG. 7A, when there is no person in a space captured by the first external electronic device, the CSI of the channel may be constant. In addition, since there is no change in the video captured by the first external electronic device when there is no person in the space captured by the first external electronic device, as illustrated in (b) of FIG. 7A, the data rate of data transmitted by the first external electronic device using real-time streaming may be constant.

For example, as illustrated in (a) of FIG. 7B, when one person is stationary on a line-of-sight path, the CSI of the channel may change. For example, the CSI of the channel may be reduced at a specific time point 710 at which a person appears, and the CSI of the channel may be recovered over time. In addition, as illustrated in (b) of FIG. 7B, a data rate of transmitting data from a time point 720 at which a person appears (stationary after appearing) in a space captured by the first external electronic device may increase. If a person remains stationary after appearing, the data rate may be constant again since no change occurs in the video to be captured. Meanwhile, since the video captured at the time point at which the person appears is transmitted through a processing process, a time delay 730 may occur between the time point 710 at which the CSI of the channel changes and the time point 720 at which the data rate changes.

For example, as illustrated in (a) of FIG. 7C, when a person walks on a line-of-sight path, the CSI of the channel may repeatedly decrease and increase in a periodic/aperiodic manner. In addition, as illustrated in (b) of FIG. 7C, when a person moves in the space captured by the first external electronic device, the data rate at which the first external electronic device captures and transmits the video may repeatedly increase and decrease. Time delays 780 and 790 may occur between the time points 740 and 750 at which the CSI of the channel changes and the time points 760 and 770 at which the data rate changes.

According to whether the time point at which the CSI of the channel through which the first external electronic device performs communication changes matches the time point at which the data rate changes, the electronic device 101 may identify whether the space where the electronic device 101 is located is captured by the first external electronic device.

Figure 8:
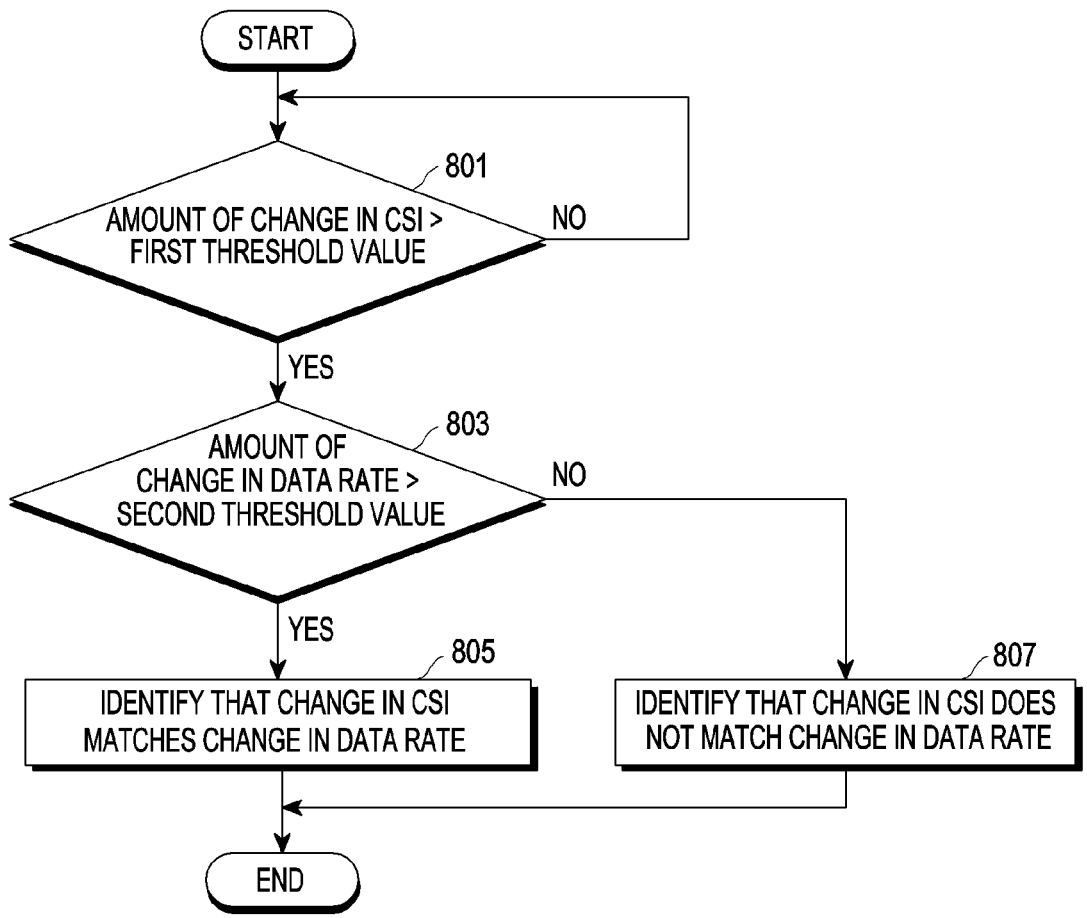
FIG. 8 illustrates a flowchart of a method for operating an electronic device according to various embodiments.

FIG. 8 illustrates a flowchart of a method for operating the electronic device 101 according to various embodiments.

According to various embodiments, in operation 801, the electronic device 101 (e.g., the processor 120) may identify whether the amount of change in the CSI of the channel through which the first external electronic device performs communication is greater than a first threshold value.

When the amount of change in the CSI of the channel is greater than the first threshold value, according to various embodiments, in operation 803, the electronic device 101 may identify whether the amount of change in the data rate is greater than a second threshold value. For example, when the amount of change in the CSI is greater than the first threshold value, the electronic device 101 may identify whether the amount of change in the data rate of the data stream transmitted by the first external electronic device is greater than the second threshold value. Meanwhile, in operation 801, when the amount of change in the data rate is greater than the second threshold value within a predetermined time after identifying that the amount of change in the CSI of the channel is greater than the first threshold value, the electronic device 101 may identify that the amount of change in the data rate is greater than the second threshold value. For example, when a predetermined time is exceeded after it is identified that the amount of change in the CSI of the channel is greater than the first threshold value, the electronic device 101 may identify that the amount of change in the data rate is less than the second threshold value.

When the amount of change in the data rate is greater than the second threshold value, according to various embodiments, in operation 805, the electronic device 101 may identify that the change in the CSI and the change in the data rate match each other. For example, when the data rate changes by exceeding the second threshold (operation 803) within a predetermined time from a time point at which the CSI of the channel changes by exceeding the first threshold value (operation 801), the electronic device 101 may identify that the change in the CSI matches the change in the data rate.

When the amount of change in the data rate is less than the second threshold value, according to various embodiments, in operation 807, the electronic device 101 may identify that the change in the CSI and the change in the data rate do not match each other. For example, when the CSI of the channel changes by exceeding (801) the first threshold value and the data rate does not change by exceeding the second threshold value within a predetermined time, the electronic device 101 may identify that the change in the CSI and the change in the data rate do not match each other.

Figure 9:
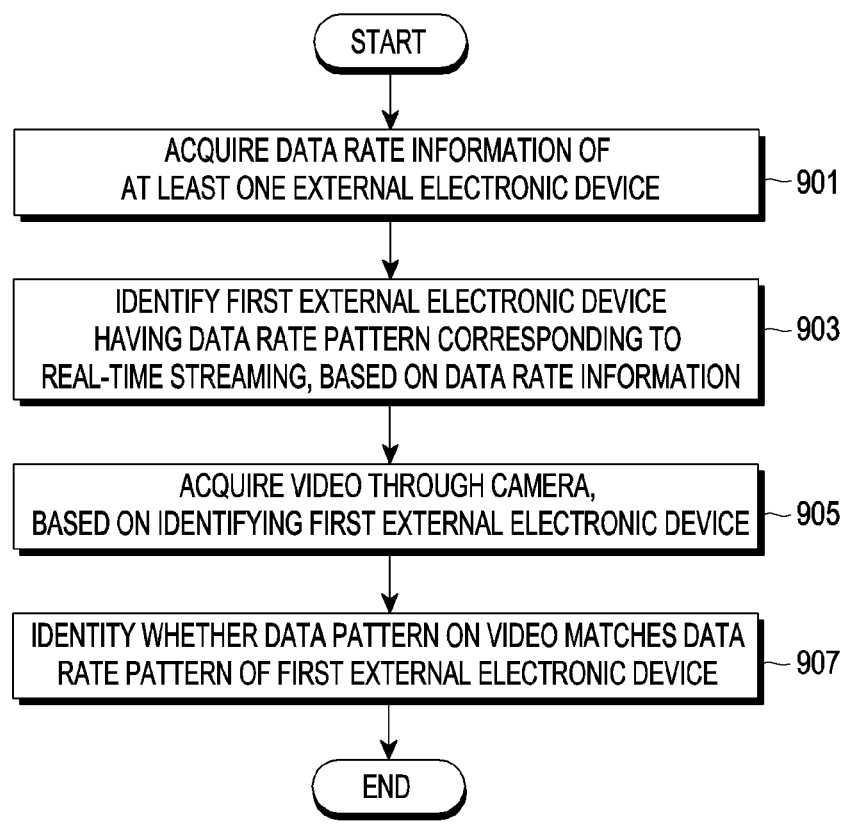
FIG. 9 illustrates a flowchart of a method for operating an electronic device according to various embodiments.
Figure 10A:
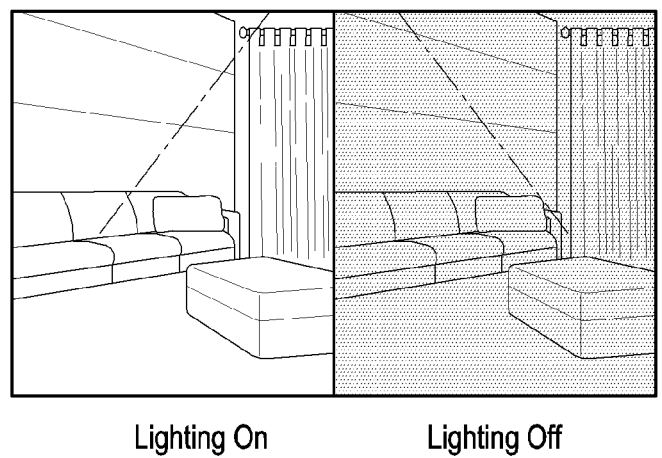
FIG. 10A illustrates a video according to various embodiments.
Figure 10B:
FIG. 10B illustrates a video according to various embodiments.
Figure 10C:
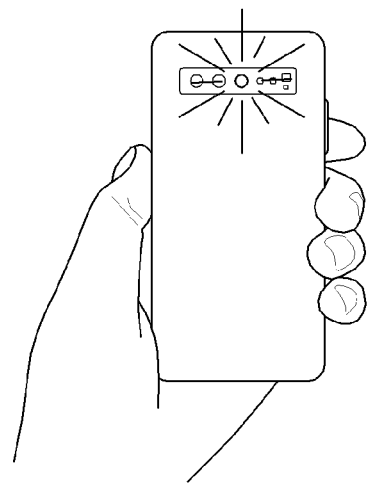
FIG. 10C illustrates a video according to various embodiments.
Figure 10D:
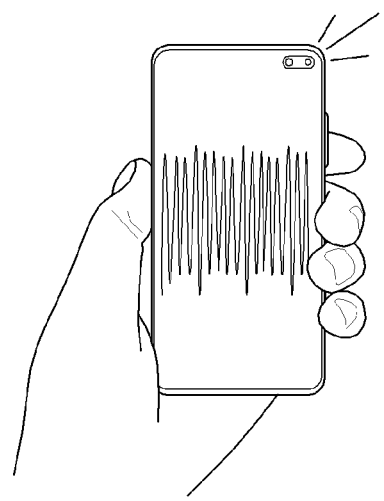
FIG. 10D illustrates a video according to various embodiments.
Figure 11:
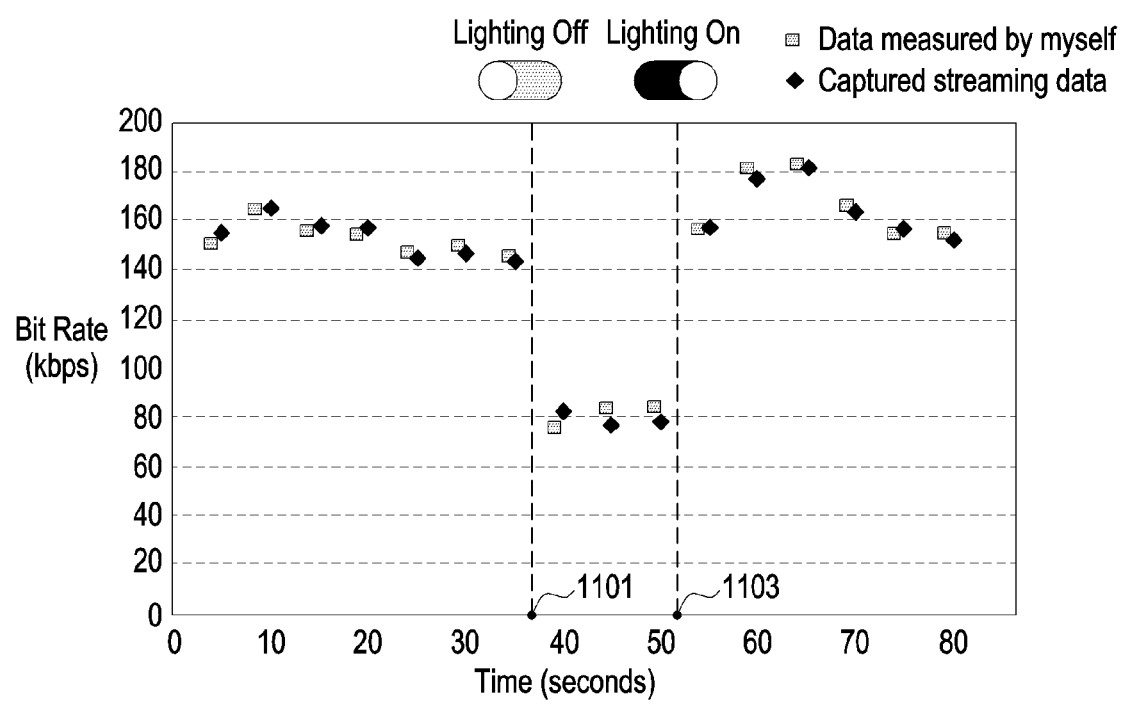
FIG. 11 illustrates bit rate of an electronic device according to various embodiments.

FIG. 9 illustrates a flowchart of a method for operating an electronic device according to various embodiments. The embodiment of FIG. 9 will be described in more detail with reference to FIGS. 10A, 10B, 10C, 10D, and 11. FIG. 10A illustrates a video according to various embodiments. FIG. 10B illustrates a video according to various embodiments. FIG. 10C illustrates a video according to various embodiments. FIG. 10D illustrates a video according to various embodiments. FIG. 11 illustrates a bit rate of an electronic device according to various embodiments.

According to various embodiments, in operation 901, the electronic device 101 (e.g., the processor 120) may acquire data rate information of at least one external electronic device. The electronic device 101 may identify packets transmitted by the at least one external electronic device that performs communication with an AP. The electronic device 101 may identify unencrypted information (e.g., a packet size, a transmission/reception address, a sequence number, a port number, etc.) among a plurality of pieces of information included in the packets. For example, the electronic device 101 may identify the packet to identify a data rate of a data stream transmitted by the at least one external electronic device. The electronic device 101 may calculate a change in the data rate in real time.

According to various embodiments, in operation 903, the electronic device 101 may identify a first external electronic device indicating a data rate pattern corresponding to real-time streaming, based on the data rate information. When the data rate is constant, the electronic device 101 may determine that the data rate corresponds to the real-time streaming. On the other hand, when the amount of change in the data rate is less than or equal to a threshold value, it may mean that the data rate is constant. Then, the electronic device 101 may inform the user of the existence of the first external electronic device using a real-time streaming service. For example, the electronic device 101 may execute the camera to display a message requesting to capture a video of a space in which the user is located or to output a voice message. Additionally, the electronic device 101 may execute the camera to capture the video of the space in which the user is located, and may display a message requesting the movement of the user in the captured space or a message requesting to repeatedly turn on/off lighting in the captured space, or may output a voice message.

According to various embodiments, in operation 905, the electronic device 101 may acquire a video through a camera (e.g., the camera module 180) based on identifying the first external electronic device. For example, in order to determine whether the first external electronic device captures the space in which the electronic device 101 is located, the electronic device 101 may acquire a video through the camera. The electronic device 101 may identify the data size of the video to be captured over time.

For example, as illustrated in FIG. 10A, the video acquired through the camera may be a video that repeatedly turns on and off the lighting. The electronic device 101 may control an external electronic device (e.g., a lighting device) connected to the electronic device 101 to capture a video while repeatedly turning on and off the lighting. The data size of a video captured while the lighting is turned on may be larger than the data size of a video captured while the lighting is turned off. When a video in which the lighting is turned on and off repeatedly is captured, the data size of the video captured by the electronic device 101 may repeatedly increase and decrease.

For example, as illustrated in FIG. 10B, the video acquired through the camera may be a video capturing a person's movement. When a person's movement is captured, the data size of the video captured by the electronic device 101 may not be constant.

For example, as illustrated in FIG. 10C, the electronic device 101 may acquire a video through the camera while turning on/off a flash. For example, the electronic device 101 may acquire a video through the camera while turning the flash on/off every 10 seconds. When a video is captured while the flash is turned on/off at a period of 10 seconds, the data size of the video captured by the electronic device 101 may increase and decrease at a period of 10 seconds.

For example, as illustrated in FIG. 10D, the electronic device 101 may acquire a video through the camera while outputting sound using a speaker (e.g., the audio output device 155). The data size of a video captured by the electronic device 101 while the sound is output may be larger than the data size of a video captured by the electronic device 101 while the sound is not output.

According to various embodiments, in operation 907, the electronic device 101 may identify whether a data pattern for the video matches a data rate pattern of the first external electronic device. When a time point at which the data size of the video captured by the electronic device 101 changes corresponds to a time point at which the data rate of the first external electronic device changes, the electronic device 101 may identify that the data pattern for the video matches the data rate pattern of the first external electronic device.

For example, as illustrated in FIG. 10A, when the electronic device 101 captures a video in which the lighting is repeatedly turned on and off, the data size of the video captured by the electronic device while the lighting is turned on may be larger than the data size of the video captured by the electronic device while the lighting is turned off. Also, the data rate of the first external electronic device while the lighting is turned on may be larger than the data rate of the first external electronic device while the lighting is turned off. Accordingly, when the electronic device 101 and the first external electronic device capture the same space, the time point at which the data size of the video captured by the electronic device 101 changes and the time point at which the data rate of the external electronic device changes correspond to each other. For example, as illustrated in FIG. 11, it is assumed that the electronic device 101 and the first external electronic device capture the same space. A first time point 1101 may be a time point at which the lighting is turned off, and a second time point 1103 may be a time point at which the lighting is turned on. The data size of the video captured by the electronic device 101 may decrease by the threshold value or greater at the first time point 1101 and may increase by the threshold value or greater at the second time point 1103. Also, the data rate that the first external electronic device performs real-time streaming may decrease by the threshold value or greater at the first time point 1101 and may increase by the threshold value or greater at the second time point 1103. That is, when the electronic device 101 and the first external electronic device capture the same space, since feedback similar to the change in the environment (e.g., turning on and off of the lighting) occurs, whether the electronic device 101 and the first external electronic device capture the same space may be determined.

For example, as illustrated in FIG. 10B, when the electronic device 101 captures a person's movement, the data size of the captured video may increase along with an increase in the active movement of the user. Also, when the first external electronic device captures a person's movement, the data rate may increase. Accordingly, when the electronic device 101 and the first external electronic device capture the movement of the same person, a time point at which the data size of the video captured by the electronic device 101 changes and a time point at which the data rate of the external electronic device changes may correspond to each other.

For example, as illustrated in FIG. 10C, when the electronic device 101 acquires a video through the camera while turning on/off the flash, the data size of the video may be changed according to a period of turning on/off the flash. Also, when the first external electronic device captures a space in which the electronic device is located, the illuminance may change depending on the on/off period of the flash. Accordingly, when the electronic device 101 and the first external electronic device capture the same space, a time point at which the data size of the video captured by the electronic device 101 changes and a time point at which the data rate of the external electronic device changes may correspond to each other.

For example, as illustrated in FIG. 10D, when the electronic device 101 acquires a video through the camera while outputting sound, the data size of the video captured while the sound is output may be larger than the data size of the video captured while no sound is output. In addition, when the first external electronic device captures the same space as the electronic device 101, the data rate of the first external electronic device while the sound is output from the electronic device 101 may be larger than the data rate of the video captured while no sound is output. Accordingly, when the electronic device 101 and the first external electronic device capture the same space, a time point at which the data size of the video captured by the electronic device 101 changes and a time point at which the data rate of the external electronic device changes may correspond to each other.

According to various embodiments, in operation 909, the electronic device 101 may identify whether the first external electronic device captures a space in which the electronic device 101 is located, based on the identification result. When it is identified that the time point at which the data size of the video captured by the electronic device 101 changes and the time point at which the data rate of the first external electronic device changes correspond to each other, it may be identified that the space captured by the first external electronic device is the space where the electronic device 101 is located.

According to various embodiments, when the electronic device 101 controls on and off of the lighting by controlling the external electronic device (e.g., a lighting device), it is possible to identify a time of turning on the lighting and a time of turning off the lighting. When time points at which the lighting is turned on and off correspond to the time point at which the data rate of the first external electronic device changes, the electronic device 101 may identify that the space in which the electronic device is located is captured by the first external electronic device. In this case, the electronic device 101 may not capture a video.

According to various embodiments, the electronic device 101 may acquire illuminance information using an illuminance sensor (e.g., the sensor module 176), and may identify a time point at which the illuminance changes to be a threshold value or greater. When the time point at which the illuminance changes to be the threshold value or greater and the time point at which the data rate of the first external electronic device changes correspond to each other, the electronic device 101 may identify that the space where the electronic device is located is captured by the first external electronic device. In this case, the electronic device 101 may not capture a video.

According to various embodiments, when the electronic device 101 turns on/off the flash, it is possible to identify the time of turning the flash on and off. When the time point at which the flash is turned on and off and the time point at which the data rate of the first external electronic device changes correspond to each other, the electronic device 101 may identify that the space where the electronic device is located is captured by the first external electronic device. In this case, the electronic device 101 may not capture a video.

According to various embodiments, the electronic device 101 may identify the time of outputting sound. When a time point at which the output of the sound is started and a time point at which the output of the sound is terminated and the time point at which the data rate of the first external electronic device changes correspond to each other, the electronic device 101 may identify that the space where the electronic device is located is captured by the first external electronic device. In this case, the electronic device 101 may not capture a video.

Figure 12:
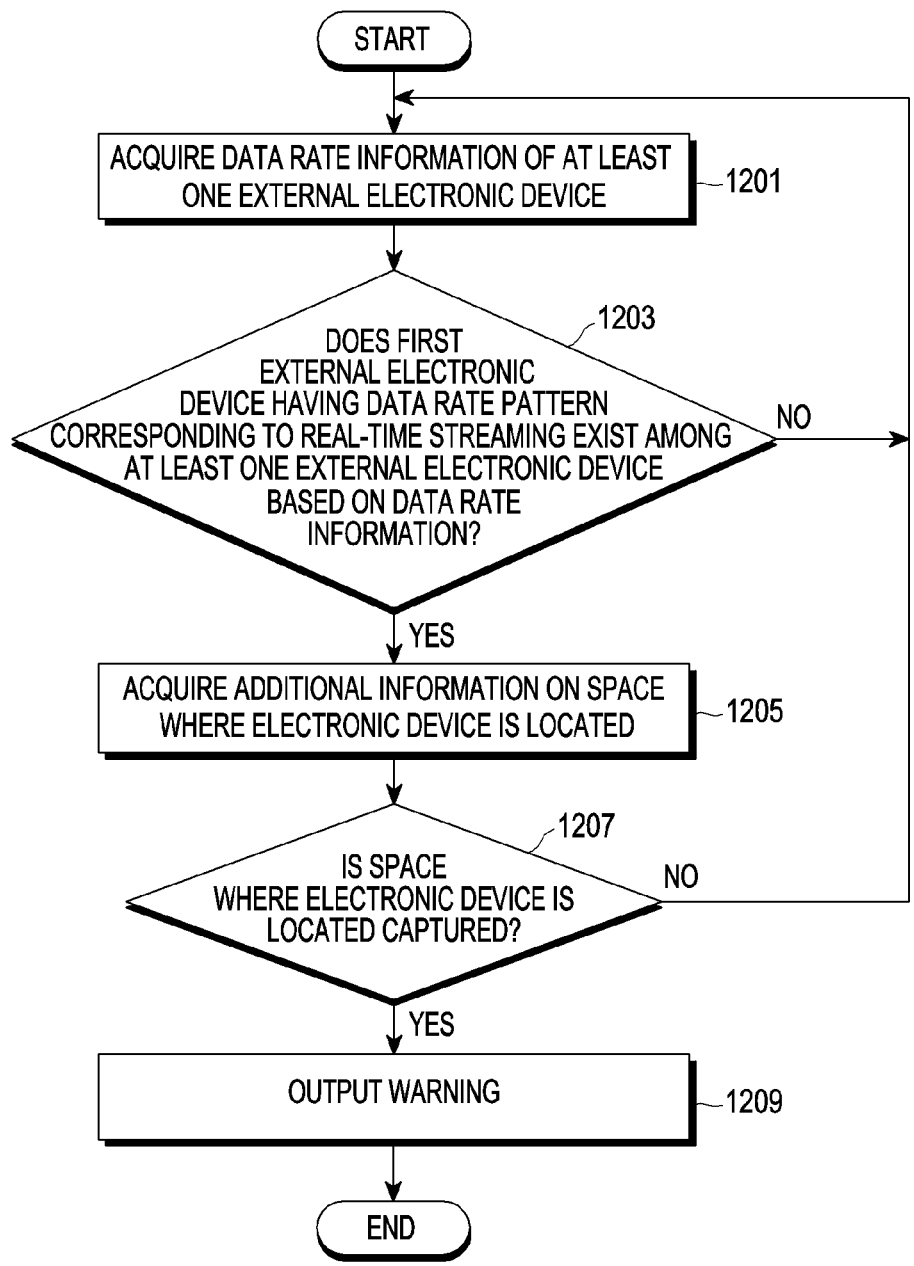
FIG. 12 illustrates a flowchart of a method for operating an electronic device according to various embodiments.

FIG. 12 illustrates a flowchart of a method for operating an electronic device according to various embodiments.

According to various embodiments, in operation 1201, the electronic device 101 (e.g., the processor 120) may acquire data rate information of at least one external electronic device. The electronic device 101 may identify packets transmitted by the at least one external electronic device that performs communication with an AP. The electronic device 101 may identify unencrypted information (e.g., a packet size, a transmission/reception address, a sequence number, a port number, etc.) among a plurality of pieces of information included in the packets. For example, the electronic device 101 may identify the packet to identify a data rate of a data stream transmitted by the at least one external electronic device. The electronic device 101 may calculate a change in the data rate in real time.

According to various embodiments, in operation 1203, the electronic device 101 may identify whether there is a first external electronic device indicating a data rate pattern corresponding to real-time streaming among the at least one external electronic device, based on the data rate information. When the data rate is constant, the electronic device 101 may determine that the data rate corresponds to the real-time streaming. Meanwhile, when the amount of change in the data rate is less than or equal to a threshold value, it may mean that the data rate is constant.

When it is determined that the first external electronic device indicating the data rate pattern corresponding to the real-time streaming does not exist among the at least one external electronic device, the electronic device 101 may return to operation 1201 to acquire data rate information of the at least one external electronic device.

When it is identified that the first external electronic device indicating the data rate pattern corresponding to the real-time streaming is present among the at least one external electronic device, according to various embodiments, in operation 1205, additional information on the space where the electronic device 101 is located may be acquired. For example, the electronic device 101 may capture a video using a camera. The video captured by the electronic device 101 may be a video capturing a space where a lighting is turned on/off, a video capturing a person's movement, or the like. For another example, the electronic device 101 may identify a CSI of a channel through which the first external electronic device performs communication. The electronic device 101 may determine the presence of a person by identifying the CSI of the channel through which the first external electronic device performs communication. For another example, the electronic device 101 may acquire illuminance information using an illuminance sensor (e.g., the sensor module 176).

According to various embodiments, in operation 1207, the electronic device 101 may identify whether the first external electronic device captures a space where the electronic device 101 is located. For example, in a case in which the electronic device 101 captures a video using a camera, when a data size pattern of the captured video corresponds to a data rate pattern in which the first external electronic device performs real-time streaming, the electronic device 101 may identify that the space where the electronic device is located is captured by the first external electronic device. When a time point at which the data size of the video captured by the electronic device 101 changes and a time point at which the data rate of the first external electronic device changes correspond to each other, the electronic device 101 may identify that the data size pattern of the captured video corresponds to the data rate pattern in which the first external electronic device performs real-time streaming. For another example, in a case in which the electronic device 101 identifies the CSI of the channel through which the first external electronic device performs communication, when the time point at which the CSI of the channel changes corresponds to the time point at which the data rate changes, the electronic device 101 may identify that the space where the electronic device 101 is located is captured by the first external electronic device. For another example, in a case in which the electronic device 101 acquires illuminance information using an illuminance sensor, when a time point at which the illuminance changes corresponds to the time point at which the data rate of the first external electronic device changes, the electronic device may identify that the space where the electronic device 101 is located is captured by the first external electronic device.

When it is identified that the space where the electronic device 101 is located is not captured by the first external electronic device, the electronic device 101 may return to operation 1201 to acquire the data rate information of the at least one external electronic device.

When it is identified that the space where the electronic device 101 is located is captured by the first external electronic device, according to various embodiments, in operation 1209, the electronic device 101 may output a warning. For example, the electronic device 101 may output a message indicating that there is a device that captures a user's space.

According to various embodiments, when it is identified that the first external electronic device captures the space where the electronic device 101 is located, the electronic device 101 may further identify whether the space where the electronic device 101 is located is captured by the first external electronic device. For example, the electronic device 101 may execute the camera to capture a space where a user is located, and may output a message requesting the movement of the user in the captured space or a message requesting to repeatedly perform on/off of the lighting. For example, the electronic device 101 may use the camera to capture the movement of a person or a space where illumination changes. When the data size pattern of the video captured by the electronic device 101 and the data rate pattern of the first external electronic device correspond to each other, the accuracy of the first external electronic device capturing the space where the electronic device 101 is located may increase.

According to various embodiments, an electronic device (e.g., the electronic device 101) may include a wireless communication module and at least one processor, wherein the at least one processor may be configured to: acquire data rate information of at least one external electronic device through the wireless communication module; identify a first external electronic device having a data rate pattern corresponding to a first condition among the at least one external electronic device based on the data rate information; identify channel state information (CSI) of a channel through which the first external electronic device performs communication, through the wireless communication module; identify whether the data rate pattern of the first external electronic device matches a CSI pattern of the channel; and identify whether a space where the electronic device is located is captured by the first external electronic device based on identifying that the data rate pattern of the first external electronic device matches the CSI pattern of the channel.

According to various embodiments, the data rate pattern of the first external electronic device may indicate a data rate of the first external electronic device in an arbitrary time period, and the at least one processor may be configured to identify whether a time point at which the CSI of the channel changes and a time point at which the data rate of the first external electronic device changes match each other, as at least a part of the identifying whether the data rate pattern of the first external electronic device matches the CSI pattern of the channel.

According to various embodiments, the at least one processor may be configured to identify that the time point at which the CSI of the channel changes and the time point at which the data rate of the first external electronic device changes match each other when a difference between a time point at which an amount of change in the CSI of the channel is greater than or equal to a first threshold value and a time point at which an amount of change in the data rate of the first external electronic device is greater than or equal to a second threshold value is less than or equal to a predetermined value, as at least a part of the identifying whether the time point at which the CSI of the channel changes and the time point at which the data rate of the first external electronic device changes match each other.

According to various embodiments, the electronic device may further include: an illuminance sensor, wherein the at least one processor may be configured to: acquire illuminance information using the illuminance sensor; and identify that the data rate pattern of the first external electronic device matches the CSI pattern of the channel when a difference between a time point at which intensity of illuminance sensed by the illuminance sensor changes and a time point at which the data rate of the first external electronic device changes is less than or equal to a predetermined value based on the illuminance information and the data rate pattern of the first external electronic device, as at least a part of the identifying whether the data rate pattern of the first external electronic device matches the CSI pattern of the channel.

According to various embodiments, the at least one processor may be configured to output a matching notification in response to identifying that the space where the electronic device is located is captured by the first external electronic device.

According to various embodiments, the electronic device may further include a camera, wherein the at least one processor may be configured to: acquire video data using the camera in response to identifying that the space where the electronic device is located is captured by the first external electronic device; identify whether the data rate pattern of the first external electronic device and a pattern of the video data match each other; and output a warning based on identifying that the data rate pattern of the first external electronic device and the pattern of the video data match each other.

According to various embodiments, the at least one processor may be configured to: control illuminance of a second external electronic device through the wireless communication module in response to identifying that the space where the electronic device is located is captured by the first external electronic device; and output a warning when the data rate pattern of the first external electronic device changes within a predetermined time after controlling the illuminance of the second external electronic device.

According to various embodiments, the electronic device may further include a speaker, wherein the at least one processor may be configured to: output sound using the speaker in response to identifying that the space where the electronic device is located is captured by the first external electronic device; and output a warning when the data rate pattern of the first external electronic device changes within a predetermined time after outputting the sound.

According to various embodiments, the electronic device may further include a flash, wherein the at least one processor may be configured to: periodically control on/off of the flash in response to identifying that the space where the electronic device is located is captured by the first external electronic device; and output a warning when a period of controlling the on/off matches a change period of the data rate pattern of the first external electronic device.

According to various embodiments, the at least one processor may be configured to: identify a data rate pattern indicating real-time streaming of data based on the data rate information of the at least one external electronic device, as at least a part of the identifying the first external electronic device having the data rate pattern corresponding to the first condition.

According to various embodiments, the data rate pattern corresponds to the first condition when the data rate pattern of the first external electronic device indicates real-time streaming of data and an amount of change in a data rate of the first external electronic device is less than or equal to a threshold value.

According to various embodiments, a method of operating an electronic device may include: acquiring data rate information of at least one external electronic device; identifying a first external electronic device having a data rate pattern corresponding to a first condition among the at least one external electronic device based on the data rate information; identifying channel state information (CSI) of a channel through which the first external electronic device performs communication; identifying whether the data rate pattern of the first external electronic device matches a CSI pattern of the channel; and identifying whether a space where the electronic device is located is captured by the first external electronic device based on identifying that the data rate pattern of the first external electronic device matches the CSI pattern of the channel.

According to various embodiments, the data rate pattern of the first external electronic device may indicate a data rate of the first external electronic device in an arbitrary time period, and the identifying whether the data rate pattern of the first external electronic device matches the CSI pattern of the channel may include identifying whether a time point at which the CSI of the channel changes and a time point at which the data rate of the first external electronic device changes match each other.

According to various embodiments, the identifying whether the time point at which the CSI of the channel changes and the time point at which the data rate of the first external electronic device changes match each other may include identifying that the time point at which the CSI of the channel changes and the time point at which the data rate of the first external electronic device changes match each other when a difference between a time point at which an amount of change in the CSI of the channel is greater than or equal to a first threshold value and a time point at which an amount of change in the data rate of the first external electronic device is greater than or equal to a second threshold value is less than or equal to a predetermined value.

According to various embodiments, the method may further include: acquiring illuminance information, wherein the identifying whether the data rate pattern of the first external electronic device matches the CSI pattern of the channel may further include identifying that the data rate pattern of the first external electronic device matches the CSI pattern of the channel when a difference between a time point at which intensity of illuminance changes and a time point at which the data rate of the first external electronic device changes is less than or equal to a predetermined value based on the illuminance information and the data rate pattern of the first external electronic device.

According to various embodiments, the method may further include outputting a matching notification in response to identifying that the space where the electronic device is located is captured by the first external electronic device.

According to various embodiments, the method may further include: acquiring video data using a camera in response to identifying that the space where the electronic device is located is captured by the first external electronic device; identifying whether the data rate pattern of the first external electronic device and a pattern of the video data match each other; and outputting a warning based on identifying that the data rate pattern of the first external electronic device and the pattern of the video data match each other.

According to various embodiments, an electronic device may include: a camera; a wireless communication module; and at least one processor, wherein the at least one processor may be configured to: acquire data rate information of at least one external electronic device through the wireless communication module; identify a first external electronic device having a data rate pattern corresponding to real-time streaming among the at least one external electronic device based on the data rate information; acquire video data by using the camera based on identifying the first external electronic device; identify whether a pattern of the video data matches the data rate pattern of the first external electronic device; and identify whether a space where the electronic device is located is captured by the first external electronic device based on identifying that the pattern of the video data matches the data rate pattern of the first external electronic device.

According to various embodiments, the video data acquired by using the camera may be video data capturing a person's movement.

According to various embodiments, the video data acquired by using the camera may be video data capturing a change in illuminance.

The master device or the task performing device according to various embodiments may be one of various types of devices. The master device or the task performing device may include, for example, a computer device, a portable communication device (e.g., a smartphone), a portable multimedia device, a portable medical device, a camera, a wearable device, or a home appliance. According to an embodiment of the disclosure, the master device or the task performing device is not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a wireless communication circuit; and
   at least one processor operably connected to the wireless communication circuit, the at least one processor configured to:
      acquire, through the wireless communication circuit, data rate information of at least one external electronic device;
      identify, based on the data rate information, a first external electronic device having a data rate pattern corresponding to a first condition among the at least one external electronic device;
      identify, through the wireless communication circuit, channel state information (CSI) of a channel in which the first external electronic device performs communication;
      identify whether a time at which the CSI of the channel changes and a time point at which a data rate of the first external electronic device changes match each other; and
      identify whether a space where the electronic device is located is captured by the first external electronic device based on identifying whether the time point at which the CSI of the channel changes and the time point at which the data rate of the first external electronic device changes match each other,
   wherein the at least one processor is further configured to,
      as at least part of the identifying whether the time point at which the CSI of the channel changes and the time point at which the data rate of the first external electronic device changes match each other:
         identify that the time point at which the CSI of the channel changes and the time point at which the data rate of the first external electronic device changes match each other when a difference between a time point at which an amount of changes in the CSI of the channel is greater than or equal to a first threshold value and a time point at which an amount of changes in the data rate of the first external electronic device is greater than or equal to a second threshold value is less than or equal to a predetermined value.

2. The electronic device of claim 1, wherein the data rate pattern of the first external electronic device indicates a data rate of the first external electronic device in an arbitrary time period.

3. The electronic device of claim 1, further comprising an illuminance sensor, wherein the at least one processor, operably connected to the illuminance sensor, is further configured to:
   acquire illuminance information using the illuminance sensor, and
   as at least a part of the identifying whether the time point at which the CSI of the channel changes and the time point at which the data rate of the first external electronic device changes match each other:
      identify, based on the illuminance information and the data rate pattern of the first external electronic device, that a difference between a time point at which intensity of illuminance sensed by the illuminance sensor changes and a time point at which a data rate of the first external electronic device changes is less than or equal to a predetermined value.

4. The electronic device of claim 1, wherein the at least one processor is further configured to output a matching notification in response to identifying that the space where the electronic device is located is captured by the first external electronic device.

5. The electronic device of claim 1, further comprising a camera, wherein the at least one processor, operably connected to the camera, is configured to:
   acquire video data using the camera in response to identifying that the space where the electronic device is located is captured by the first external electronic device;
   identify whether the data rate pattern of the first external electronic device and a pattern of the video data match each other; and
   output a warning notification based on identifying that the data rate pattern of the first external electronic device and the pattern of the video data match each other.

6. The electronic device of claim 1, wherein the at least one processor is further configured to:
   control, through the wireless communication circuit, illuminance of a second external electronic device in response to identifying that the space where the electronic device is located is captured by the first external electronic device; and
   output a warning notification when the data rate pattern of the first external electronic device changes within a predetermined time after controlling the illuminance of the second external electronic device.

7. The electronic device of claim 1, further comprising a speaker, wherein the at least one processor, operably connected to the speaker, is further configured to:
   output, using the speaker, a sound in response to identifying that the space where the electronic device is located is captured by the first external electronic device; and
   output a warning notification when the data rate pattern of the first external electronic device changes within a predetermined time after outputting the sound.

8. The electronic device of claim 1, further comprising a flash, wherein the at least one processor, operably connected to the flash, is further configured to:
   periodically control the flash in response to identifying that the space where the electronic device is located is captured by the first external electronic device; and
   output a warning notification when a period for controlling the flash matches a change period of the data rate pattern of the first external electronic device.

9. The electronic device of claim 1, wherein the at least one processor is further configured to, as at least a part of identifying of the first external electronic device having the data rate pattern corresponding to the first condition:
  identify a data rate pattern indicating a real-time streaming of data based on the data rate information of the at least one external electronic device.

10. The electronic device of claim 1, wherein, the data rate pattern corresponds to the first condition when the data rate pattern of the first external electronic device indicates a real-time streaming of data and an amount of changes in a data rate of the first external electronic device is less than or equal to a threshold value.

11. A method of an electronic device, the method comprising:
  acquiring data rate information of at least one external electronic device;
  identifying based on the data rate information, a first external electronic device having a data rate pattern corresponding to a first condition among the at least one external electronic device;
  identifying channel state information (CSI) of a channel in which the first external electronic device performs communication;
  identifying whether a time point at which the CSI of the channel changes and a time point at which a data rate of the first external electronic device changes match each other; and
  identifying whether a space where the electronic device is located is captured by the first external electronic device based on identifying whether the time point at which the CSI of the channel changes and the time point at which the data rate of the first external electronic device changes match each other,
  wherein identifying whether the time point at which the CSI of the channel changes and the time point at which the data rate of the first external electronic device changes match each other comprises identifying that the time point at which the CSI of the channel changes and the time point at which the data rate of the first external electronic device changes match each other when a difference between a time point at which an amount of changes in the CSI of the channel is greater than or equal to a first threshold value and a time point at which an amount of changes in the data rate of the first external electronic device is greater than or equal to a second threshold value is less than or equal to a predetermined value.

12. The method of claim 11, wherein the data rate pattern of the first external electronic device indicates a data rate of the first external electronic device in an arbitrary time period.

13. The method of claim 11, further comprising acquiring illuminance information,
  wherein identifying whether the time point at which the CSI of the channel changes and the time point at which the data rate of the first external electronic device changes match each other comprises identifying, based on the illuminance information and the data rate pattern of the first external electronic device, that a difference between a time point at which intensity of illuminance changes and a time point at which a data rate of the first external electronic device changes is less than or equal to a predetermined value.

14. The method of claim 11, further comprising outputting a matching notification in response to identifying that the space where the electronic device is located is captured by the first external electronic device.

15. The method of claim 11, further comprising:
  acquiring video data using a camera in response to identifying that the space where the electronic device is located is captured by the first external electronic device;
  identifying whether the data rate pattern of the first external electronic device and a pattern of the video data match each other; and
  outputting a warning notification based on identifying that the data rate pattern of the first external electronic device and the pattern of the video data match each other.

16. An electronic device comprising:
  a camera;
  a wireless communication circuit; and
  at least one processor operably connected to the camera and the wireless communication circuit, the at least one processor configured to:
    acquire data rate information of at least one external electronic device through the wireless communication circuit;
    identify based on the data rate information, a first external electronic device having a data rate pattern corresponding to a real-time streaming among the at least one external electronic device;
    acquire, by using the camera, video data based on identifying the first external electronic device;
    identify whether a time point at which the video data changes and a time point at which a data rate of the first external electronic device changes matches each other; and
    identify whether a space where the electronic device is located is captured by the first external electronic device based on identifying whether the time point at which the video data changes and the time point at which the data rate of the first external electronic device changes match each other,
  wherein the at least one processor is further configured to, as at least part of the identifying whether the time point at which the video data changes and the time point at which the data rate of the first external electronic device changes match each other:
    identify that the time point at which the video data changes and the time point at which the data rate of the first external electronic device changes match each other when a difference between a time point at which an amount of changes in the video data is greater than or equal to a first threshold value and a time point at which an amount of changes in the data rate of the first external electronic device is greater than or equal to a second threshold value is less than or equal to a predetermined value.

17. The electronic device of claim 16, wherein the video data acquired by using the camera is video data capturing a person's movement.

18. The electronic device of claim 16, wherein the video data acquired by using the camera is video data capturing a change in illuminance.

* * * * *